(12) United States Patent
DeJule

(10) Patent No.: US 8,587,522 B2
(45) Date of Patent: Nov. 19, 2013

(54) MOUSE FOR OPERATING AN ELECTRONIC DEVICE

(76) Inventor: Aaron DeJule, Chicago, IL (US)

( * ) Notice: Subject to any disclaimer, the term of this patent is extended or adjusted under 35 U.S.C. 154(b) by 340 days.

(21) Appl. No.: 13/008,478

(22) Filed: Jan. 18, 2011

(65) Prior Publication Data

US 2012/0182218 A1   Jul. 19, 2012

(51) Int. Cl.
 *G06F 3/033* (2013.01)
(52) U.S. Cl.
 USPC ............................ 345/163; 345/156; 345/157
(58) Field of Classification Search
 USPC ............................... 345/161, 163; 74/471 XY
 See application file for complete search history.

(56) References Cited

U.S. PATENT DOCUMENTS

| | | | |
|---|---|---|---|
| 4,780,707 A | 10/1988 | Selker | |
| 4,922,236 A | 5/1990 | Heady | |
| D332,446 S | 1/1993 | Lin | |
| 5,210,405 A | 5/1993 | Toyoda et al. | |
| D340,706 S | 10/1993 | Hu | |
| 5,434,594 A | 7/1995 | Martinelli et al. | |
| 5,790,101 A | 8/1998 | Schoch et al. | |
| 5,805,143 A | 9/1998 | Myers | |
| 5,999,170 A | 12/1999 | Ooura et al. | |
| 6,040,758 A | 3/2000 | Sedor et al. | |
| 6,151,015 A | 11/2000 | Badyal et al. | |
| 6,169,537 B1 | 1/2001 | Taft | |
| 6,377,239 B1 | 4/2002 | Isikawa | |
| 6,377,245 B1 | 4/2002 | Park | |
| 6,427,553 B1 * | 8/2002 | Hogberg et al. | ........ 74/471 XY |
| 6,714,188 B1 | 3/2004 | Zebuhr et al. | |
| 6,756,967 B2 * | 6/2004 | Onodera et al. | .............. 345/161 |
| 6,762,750 B2 * | 7/2004 | Ullman | .......... 345/163 |
| 6,795,057 B2 * | 9/2004 | Gordon | .......... 345/163 |
| 6,992,602 B2 | 1/2006 | Alexander et al. | |
| 7,030,864 B2 | 4/2006 | Yueh | |
| 7,071,921 B2 | 7/2006 | Hsu | |
| 7,098,894 B2 | 8/2006 | Yang et al. | |
| 7,199,791 B2 | 4/2007 | Sun | |
| 7,791,598 B2 | 9/2010 | Bathiche | |
| 2004/0032392 A1 | 2/2004 | Chi et al. | |
| 2005/0110779 A1 | 5/2005 | Huang et al. | |
| 2006/0028456 A1 | 2/2006 | Kang | |
| 2006/0109262 A1 | 5/2006 | Yeh | |
| 2006/0164394 A1 | 7/2006 | Tu | |
| 2007/0024586 A1 | 2/2007 | Chang et al. | |
| 2007/0152971 A1 | 7/2007 | Chang | |
| 2008/0204415 A1 | 8/2008 | Jung et al. | |
| 2008/0225003 A1 * | 9/2008 | Fahlander | ............... 345/163 |
| 2009/0225031 A1 | 9/2009 | Kim | |
| 2010/0045600 A1 | 2/2010 | Pilkington et al. | |
| 2011/0128258 A1 | 6/2011 | Liang | |

\* cited by examiner

*Primary Examiner* — Quan-Zhen Wang
*Assistant Examiner* — Troy Dalrymple
(74) *Attorney, Agent, or Firm* — Wood, Phillips, Katz, Clark & Mortimer

(57) ABSTRACT

A mouse for operating an electronic device and having an actuating base, that is movable relative to a guide surface to thereby perform a function on an associated electronic device, and a moving assembly for the actuating base. The moving assembly has an elongate member. The elongate member is constructed to be: a) operatively held in a user's hand that is configured to hold the elongate member in the same manner that an elongate writing instrument would be held by a user's hand during a writing action; and b) moved while being operatively held to thereby cause the actuating base to be moved relative to the surface. The elongate member connected to the actuating base for controlled guided movement relative to the actuating base.

22 Claims, 9 Drawing Sheets

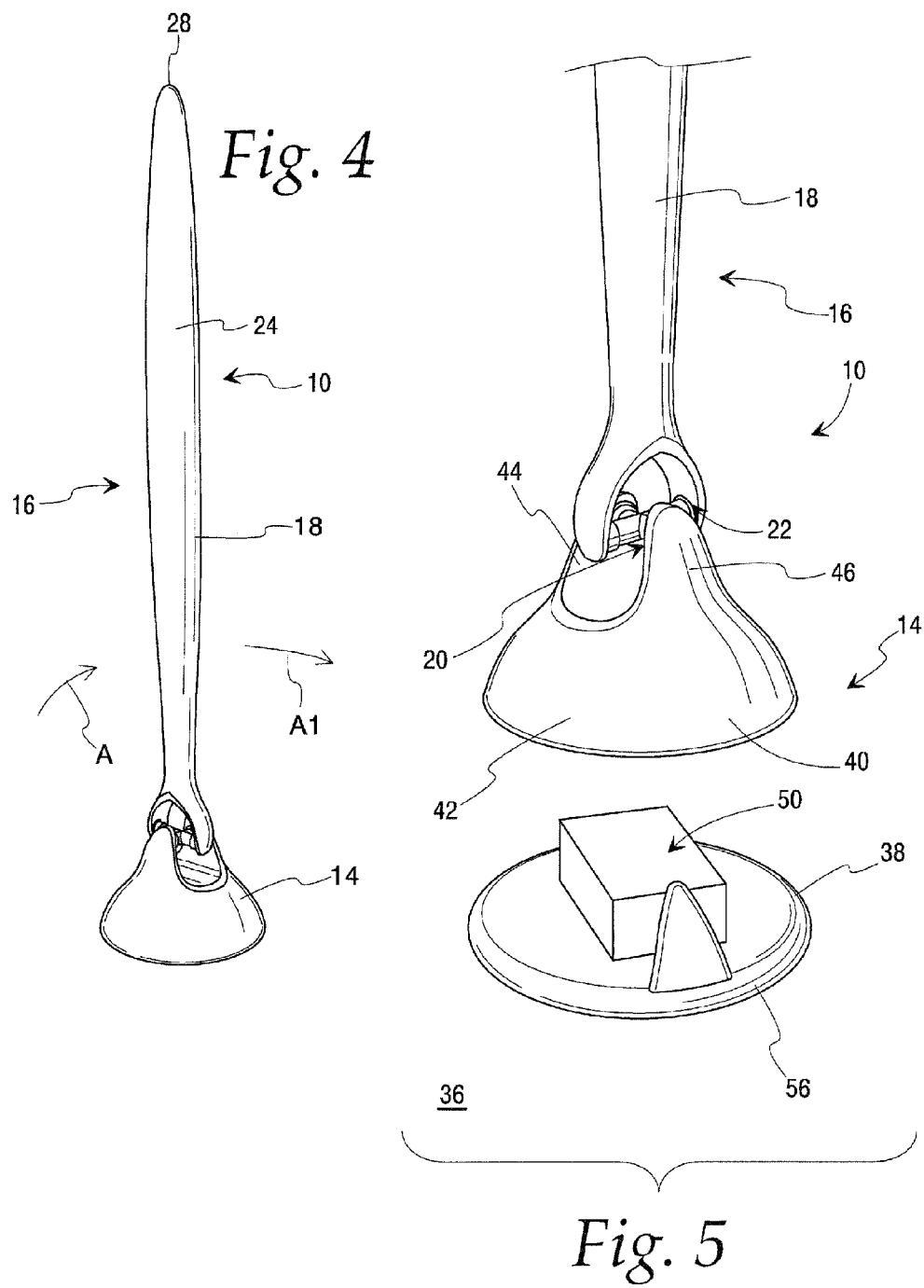

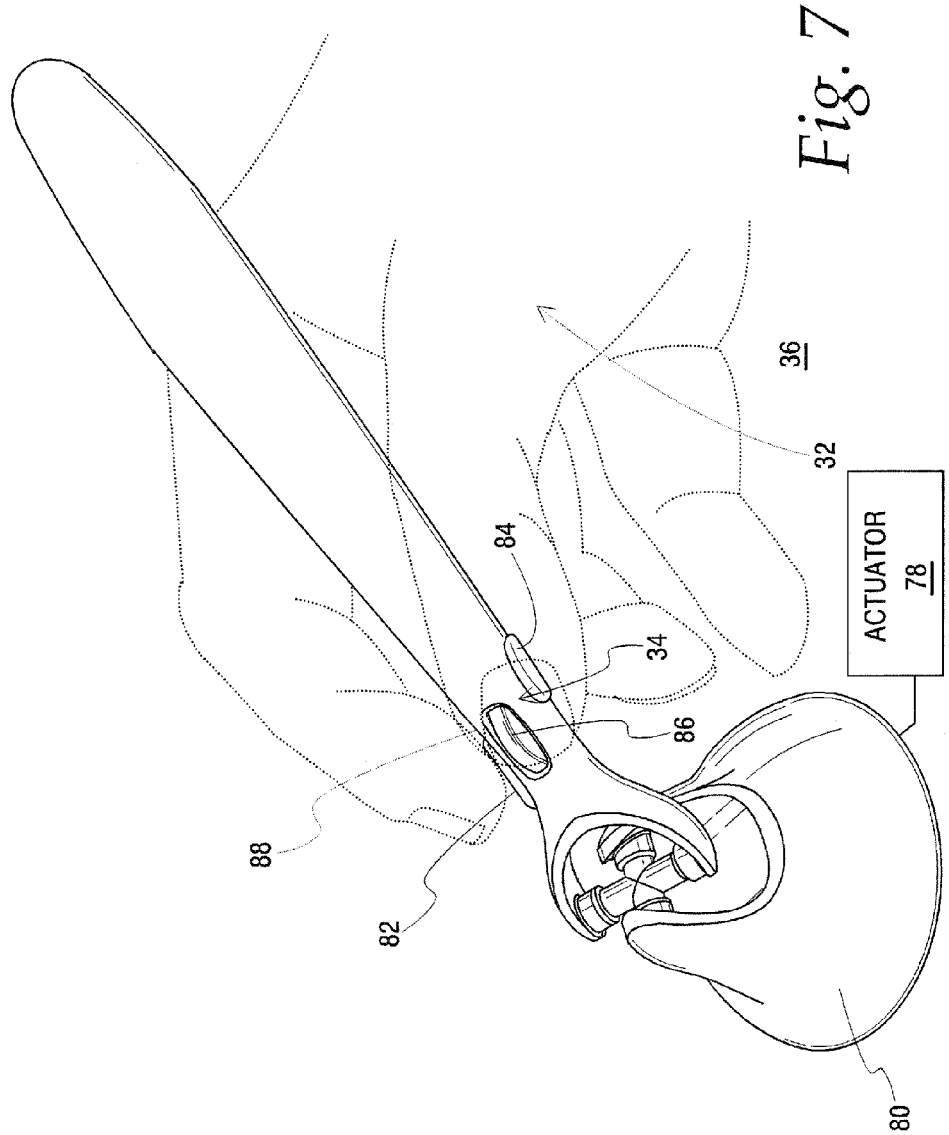

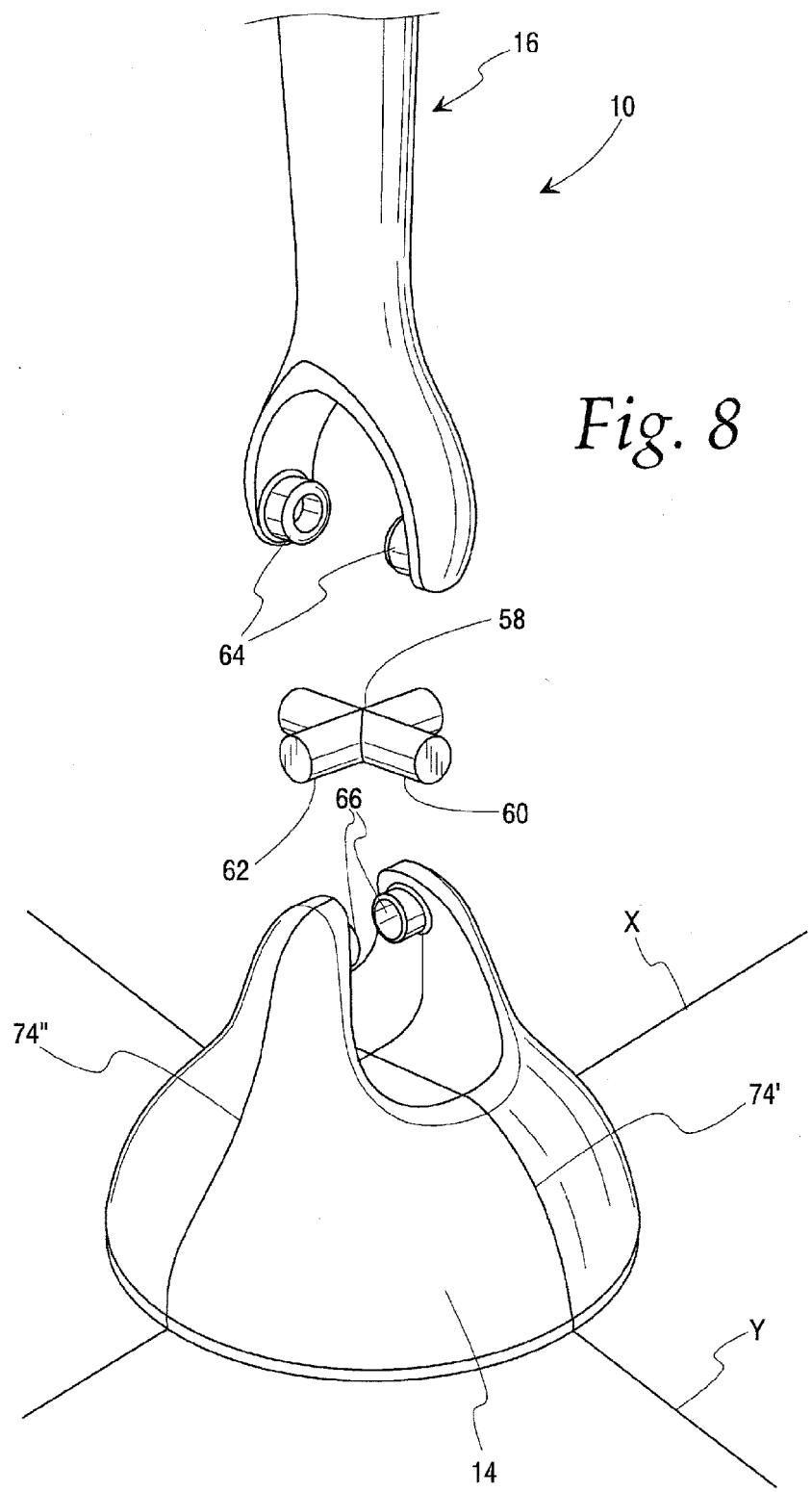

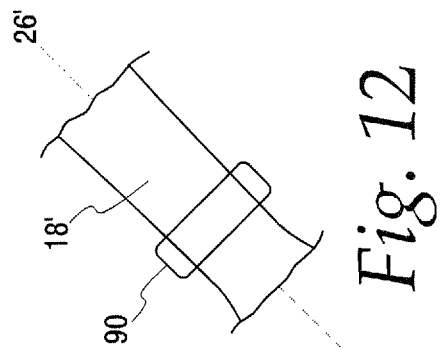
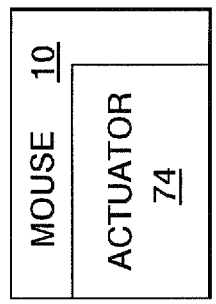
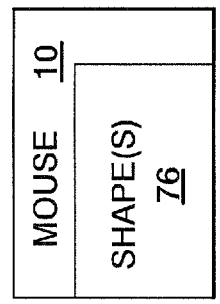
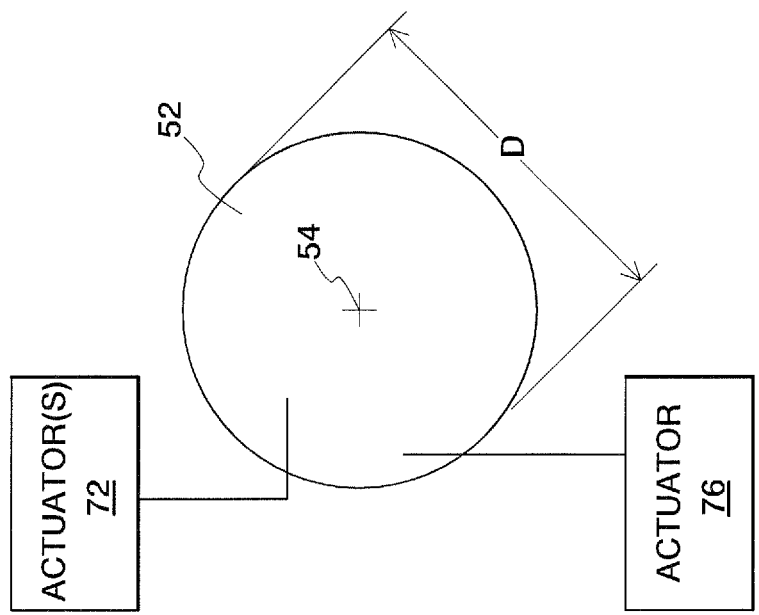

MOUSE FOR OPERATING AN ELECTRONIC DEVICE

BACKGROUND OF THE INVENTION

1. Field of the Invention

This invention relates to a mouse for an electronic device and, more particularly, to a mouse having an actuating base and a moving assembly for the actuating base with an elongate member that is repositionable relative to the actuating base.

2. Background Art

The computer mouse has been around for decades. In its basic form, a housing is provided to be supported on a flat guide surface that is typically planar and horizontally oriented. Two-dimensional motion of the housing causes movement of a cursor on a display. Wheels and one or more buttons are operable to perform different operations, dependent upon the system hardware and software.

The mouse housing is typically made with a nominally rectangular footprint surface that blends upwardly into a convex shape that can be nested in a user's hand with the user's hand in a palm down orientation relative to a horizontal guide surface. The housing is normally shaped and dimensioned so that when operatively held by a user's hand, the user's palm abuts to, and can be slid along, the horizontal guide surface for the mouse. The mouse is designed so that the footprint surface maintains continuous contact with the underlying guide surface whereupon there is continuous and uninterrupted interfacing with an associated computer.

Computer usage continues to increase, in the workplace, at home, and as a recreational activity. Workers may spend a majority of a workday operating a mouse. With the above, traditionally-shaped mouse, this extensive use may lead to physical injuries, such as carpal tunnel syndrome, forearm or elbow tendonitis, trigger finger, muscle and tissue damage, etc., and, short of injury, muscular fatigue. This problem is aggravated by repeated motions such as movement of the wrist from side to side and clicking of mouse buttons.

The potential for injury results from the fact that the hand operating the traditional mouse is rotated from the safest and most efficient "neutral" hand position, wherein the hand is at rest such as on a lap wherein the little finger lies against the lap, the thumb projects upwardly, and the palm is open to the side facing inwardly. To grasp the traditional mouse, the hand is turned so that the thumb is rotated downwardly, with the wrist region at the base of the thumb engaging the underlying surface. This produces a significant bending of the wrist that may be maintained for extensive periods as the mouse is operated. As a result, the carpal tunnel nerve becomes compressed and blood flow to the hand may be restricted. Movement of the mouse causes the wrist to incline upwardly and move from side to side to aggravate this condition.

A multitude of different mouse housings have been designed and are currently available on a commercial level. However, most of these mouse designs focus on user feel while still maintaining the palm down hand orientation that is detrimental to the user's hand and wrist constitution.

One alternative mouse construction is the "pen mouse" that incorporates an optical device in the handle thereof. The user is required to hold a pen strategically above a work surface for computer pointing. While the desired neutral hand position may be maintained, the controlled elevation and shifting of the mouse requires the bending of the wrist joint and a constant tension in this region to operate the mouse. The hovering relationship of the mouse also makes it difficult to generate fine motor control.

Another drawback with optical pen devices is that some designs require perpendicularity to the work surface. This requires an awkward hand and wrist angle that again may contribute to physical fatigue and/or injuries.

Pen tablets have limitations similar to those of the above-described pen mouse. Pen tablets further require a tablet to work in conjunction with the pen while interfacing with a computer.

In U.S. Pat. No. 6,795,057, issued to Gary B. Gordon, a design is shown in FIG. 1a incorporating a "mouse-pen" construction. A cylindrical rod is designed to be held generally as one would conventionally hold a writing instrument to carry out a writing action. The graspable rod is connected to a base through a flexible coupling that is described to be a bendable piece of plastic or elastomer that returns to a set shape. A number of limitations appear inherent to this design.

First of all, the rod has a pre-selected orientation relative to the base that may not be comfortably adaptable to all users. While the rod could be reoriented by bending the plastic/elastomer, this action may cause the base to tilt relative to the underlying surface, which may interrupt computer interfacing.

Further, by reason of the relationship between the rod and base, grasping of the rod as a writing instrument would cause interference between the user's fingertips and the base. To avoid this situation, the fingers may be repositioned to grasp the base, which may shift the hand out of the preferred neutral position towards a palm down orientation, as shown in FIG. 2D. While the rod may continue to function to facilitate grasping of the mouse by a user, the ergonomic advantages that may avoid injury or fatigue may be lost in good part or altogether.

While the use of computer mice on a worldwide basis is extensive, and has been for years, and the use of an external mouse is common with the majority of these uses, the industry has not arrived at a design that is effectively operational yet addresses the above concerns—notably user injury and fatigue associated with extensive mouse manipulation with a user's hand less than optimally oriented. The industry is in critical need of a mouse design that will allow extensive use thereof without any significant detrimental physical effects.

SUMMARY OF THE INVENTION

In one form, the invention is directed to a mouse for operating an electronic device. The mouse has an actuating base that is movable relative to a guide surface to thereby perform a function on an associated electronic device, and a moving assembly for the actuating base. The moving assembly has an elongate member with a central lengthwise axis. The elongate member is constructed to be: a) operatively held in a user's hand that is configured to hold the elongate member in the same manner that an elongate writing instrument would be held by the user's hand during a writing action; and b) moved while being operatively held to thereby cause the actuating base to be moved relative to the surface. The elongate member is connected to the actuating base for controlled guided movement relative to the actuating base to thereby change an angular relationship between the central lengthwise axis of the elongate member and the actuating base.

In one form, the elongate member is connected to the housing through a joint wherein the elongate member pivots relative to the actuating base around an axis.

In one form, the elongate member is connected to the housing through a joint wherein the elongate member pivots relative to the actuating base around first and second transverse axes.

In one form, the elongate member is connected to the housing through a universal joint.

In one form, the actuating base is configured with a footprint surface to be operatively positioned against and movable relative to a flat surface to perform a function on an associated electronic device, and with the actuating base operatively positioned and the elongate member operatively held, the central axis of the elongate member extends through the footprint surface.

In one form, the actuating base is configured to be operatively positioned against and movable relative to a flat surface to perform a function on an associated electronic device, and with the actuating base operatively positioned and the elongate member operatively held, the central axis of the elongate member does not extend through the footprint surface.

In one form, the elongate member is connected to the actuating base through cooperating ball and socket components.

In one form, the mouse has cooperating components on the moving assembly and actuating base that cause the elongate member to be blocked in at least one predetermined angular position relative to the actuating base.

In one form, the mouse has cooperating components on the moving assembly and actuating base that releasably maintain the elongate member in at least one predetermined angular position relative to the actuating base.

In one form, the cooperating components are configured so that the elongate member can be moved: a) in a first direction in a first path up to and into the one predetermined angular position; and b) in the first direction and first path beyond the one predetermined angular position.

In one form, the mouse further includes an assembly for selectively varying resistance to relative movement between the elongate member and actuating base.

In one form, there is a repositionable actuator on the moving assembly for performing a function on an associated electronic device.

In one form, there is a repositionable actuator on the actuating base for performing a function on an associated electronic device.

In one form, the mouse is provided in combination with an electronic device to which the mouse is operatively connected.

In one form, the actuating base is configured to move in predetermined operating paths relative to the cooperating surface and the actuating base and/or moving assembly has at least one of: a) a shape; and b) indicia thereon that indicates to a user an orientation of the mouse to allow the user to controllably orient and move the mouse in the predetermined operating paths.

In one form, the actuating base is configured with a flat footprint surface that is substantially circular with an orthogonal central axis and the elongate member is connected to the actuating base adjacent to the central axis.

In one form, the mouse further includes a lock assembly through which the elongate member can be releasably fixed relative to the actuating base.

In one form, the repositionable actuator is operable by a user's hand with the user's hand operatively holding the elongate member in the same manner that an elongate writing instrument would be held by the user's hand during a writing action.

In one form, the flat footprint surface has a diameter that is not greater than 2½ inches.

In one form, the elongate member has a nominally cylindrical outer surface.

BRIEF DESCRIPTION OF THE DRAWINGS

FIG. 4 is a perspective view of one specific form of mouse, as shown in FIGS. 1-3;

FIG. 5 is an enlarged, fragmentary, exploded, perspective view of the mouse in FIG. 4;

FIG. 7 is an enlarged, perspective view of the mouse in FIGS. 4-6 operatively held in the hand of a user;

FIG. 8 is a fragmentary, exploded, perspective view of the mouse in FIGS. 4-7;

FIG. 9 is a bottom view of the mouse in FIGS. 4-8;

FIG. 10 is a schematic representation of the mouse with indicia thereon for facilitating visual orientation of the mouse;

FIG. 11 is a schematic representation of the inventive mouse with specific shapes for the components thereof that facilitate visual and/or tactile orientation thereof;

FIG. 12 is a fragmentary, elevation view of a modified form of elongate member with an actuator in the form of a rotary dial extending therearound;

DETAILED DESCRIPTION OF THE PREFERRED EMBODIMENT

Figure 1:
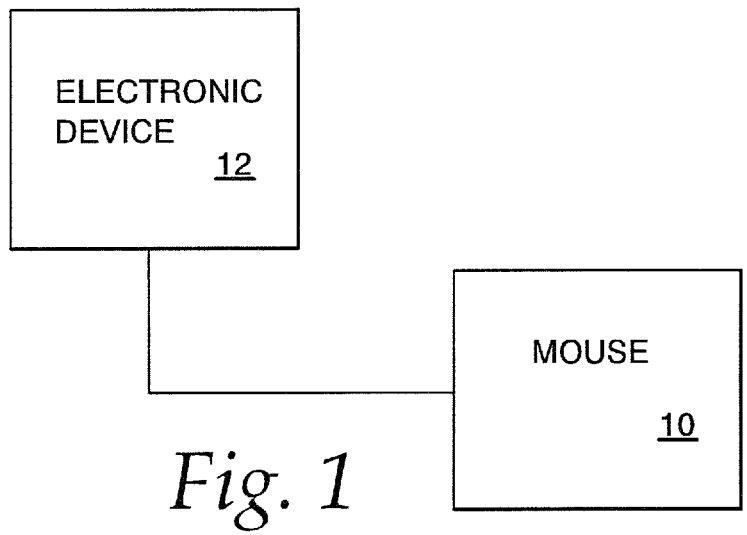
FIG. 1 is a schematic representation of a mouse, according to the present invention, operatively associated with an electronic device.

The present invention is directed to a mouse 10, as shown schematically in FIG. 1, which is usable to operate an electronic device 12. While the electronic device 12 will typically be identified as a "computer", the schematic showing in FIG.

1 is intended to encompass any type of electronic device which the mouse 10 may interface with to control any function thereof. The interfacing may be through a wired or wireless connection. The schematic showing in FIG. 1 is intended to encompass virtually a limitless number of different electronic devices that currently exist or may be developed.

Figure 2:
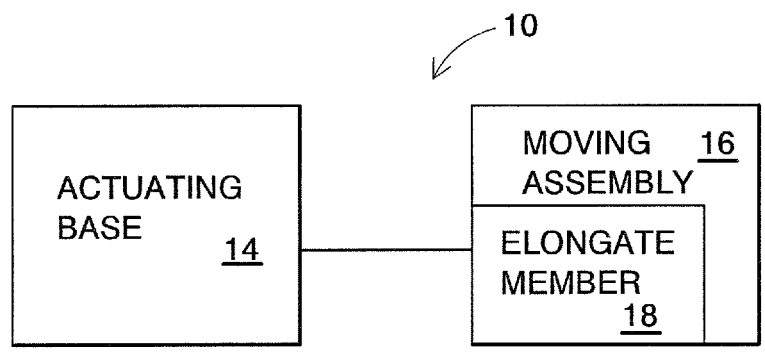
FIG. 2 is a schematic representation of the mouse in FIG. 1, including an actuating base and a moving assembly connected thereto and having an elongate member.

The mouse 10, as shown schematically in FIG. 2, consists of an actuating base 14 that is movable relative to a guide surface to thereby perform a function on an associated electronic device 12. A moving assembly 16 is provided for the actuating base 14. The moving assembly 16 has an elongate member 18 with a central lengthwise axis. The elongate member 18 is constructed to be: a) operatively held in a user's hand that is configured to hold the elongate member in the same manner that an elongate writing instrument would be held by the user's hand during a writing action; and b) moved while being operatively held to thereby cause the actuating base 14 to be moved relative to a guide surface.

Figure 3:
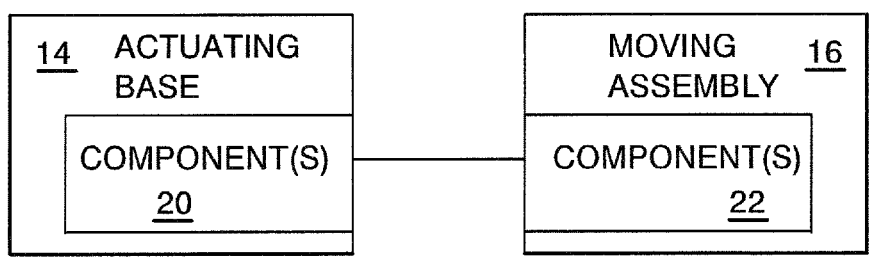
FIG. 3 is a schematic representation of cooperating components on a joint through which the actuating base and moving assembly are connected to each other.
Figure 6:
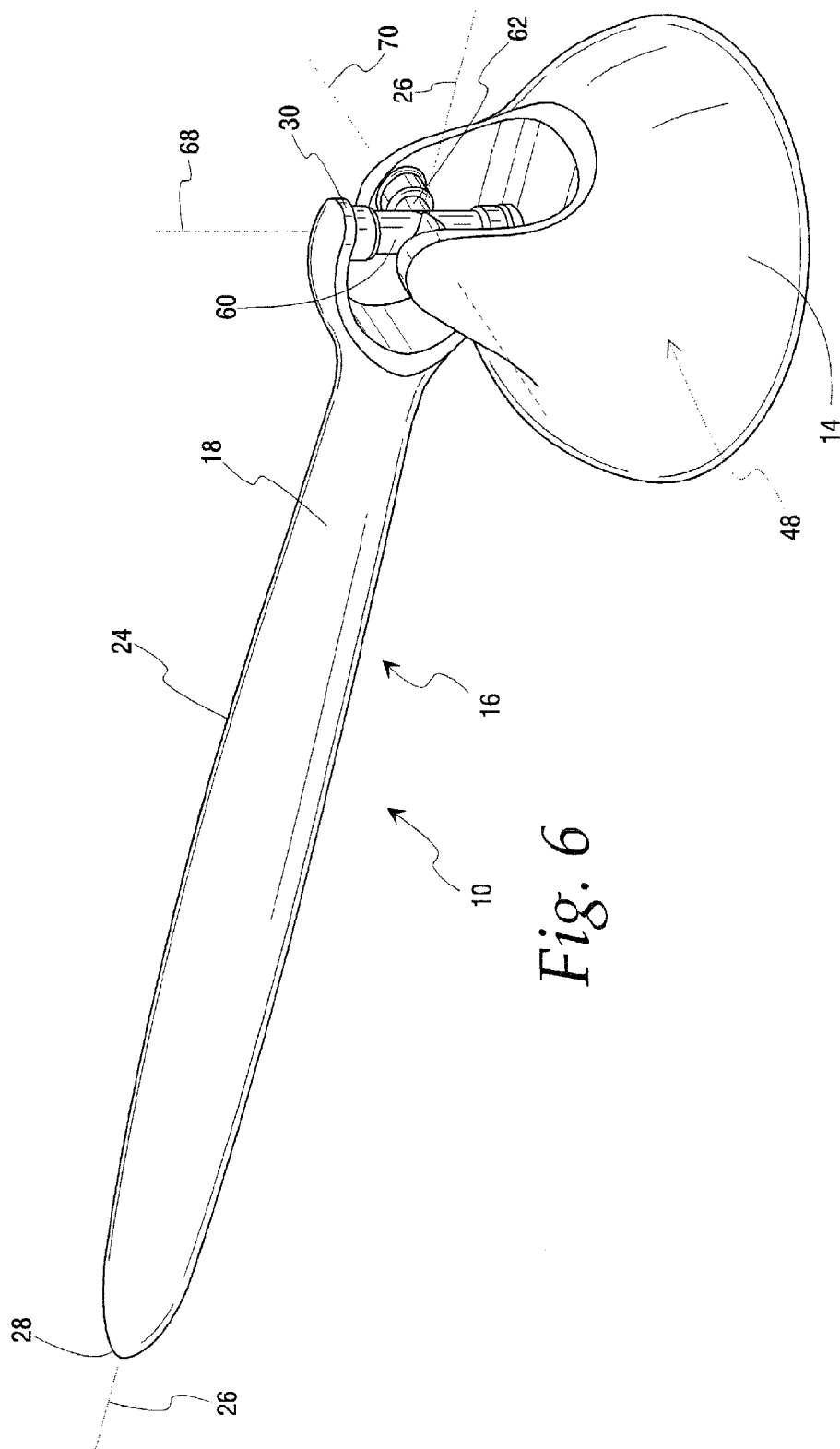
FIG. 6 is an enlarged, perspective view of the mouse in FIGS. 4 and 5 with the elongate member in a different angular relationship.

As shown in FIG. 3, it is contemplated that the actuating base 14 and moving assembly 16 are joined through one or more components 20, 22, respectively thereon, that cooperate to cause the elongate member to be connected to the actuating base 14 for controlled guided movement relative thereto to thereby change an angular relationship between the central lengthwise axis of the elongate member 18 and the actuating base 14.

The schematic showing of components in FIGS. 2 and 3 is intended to encompass essentially unlimited variations of the basic components, as shown in the exemplary forms hereinbelow. One skilled in the art would readily derive many variations based upon the following teachings and the preferred embodiment. The schematic showing is intended to encompass all such variations.

Referring now to FIGS. 4-11, one specific form of mouse 10, according to the invention, is shown. The mouse 10 has the aforementioned actuating base 14 and moving assembly 16, with the latter incorporating the elongate member 18.

The elongate member 18 has a nominally cylindrical outer surface 24. The elongate member 18 has a lengthwise central axis 26 and axially spaced ends 28, 30. The end 28 is rounded for user comfort.

The end 30 is bifurcated and incorporates the component 22 that cooperates with the component 20 on the actuating base 14 to define a universal joint, as hereinafter described. The outer surface 24 has a progressively changing diameter to define a smooth contour that approximates that of a conventional pen. As shown in FIG. 7, the elongate member 18 is operatively held in a user's hand 32 with the user's hand 32 configured to hold the elongate member 18 in the same manner that an elongate writing instrument would be held during a writing activity. The FIG. 7 hand position is the optimal "neutral" hand position, with a locally tapered region 34 of the elongate member 18 between the user's thumb, middle finger, and index finger, with the thumb elevated above the surface 36 which is normally, but not necessarily, planar and horizontal.

The actuating base 14 is shown with a bottom wall 38 and a cap portion 40. The cap portion 40 has a wall 42 approximating the shape of a truncated sphere that blends into a pair of spaced ears 44, 46. The peripheral wall of the actuating base 14 has a generally circular perimeter shape around its vertical axis. The diameter of the actuating base is substantially greater than the diameter of the elongate member around its lengthwise axis. The diameter of the perimeter shape of the actuating base 14 decreases progressively from a location adjacent the bottom of the actuating base 14 over a majority of the height of the actuating base 14 between its top and bottom.

With the cap portion 40 and bottom wall 38 connected, they cooperatively bound a chamber 48 within which mouse operating components 50 can be placed.

The bottom wall 38 defines a flat footprint surface 52 that has a diameter D that preferably is not greater than 2½ inches. This limitation is not critical, however. The cap portion 40 has a substantially constant radius around a central axis 54 of the actuating base 14, with the exception of the location at which the ears 44, 46 are located.

The peripheral edge 56 of the bottom wall 38 is rounded to avoid hangup of the actuating base 14 upon any obstruction on the surface 36 that may be either integral therewith or situated thereupon.

As shown in FIG. 8, the mouse 10 has a dual axle member 58 with separate axles 60, 62 mounted for pivoting movement in receptacles 64, 66 on the elongate member 18 and actuating base 14, respectively. The axle 60 guides movement of the elongate member 18 about an axis 68, with the axle 62 guiding movement of the actuating base 14 around an orthogonal axis 70. With the member 58 in place, the bifurcated end 30 of the elongate member 18 and ears 44, 46 on the actuating base 14 mesh in a manner that allows a conventional universal joint motion between the elongate member 18 and actuating base 14. While the configuration of the end 30 and ears 44, 46 is such that in certain relative positions for the elongate member 18 and actuating base 14 their relative movement will be limited, one skilled in the art can design these elements to permit any degree of relative movement therebetween as a particular application may demand.

With the depicted construction, the mouse 10 can be used by operatively holding the elongate member 18, as seen in FIG. 7. The user's hand 32 can then be slid guidingly against the surface 36 to reposition the mouse 10 while maintaining the plane of the footprint surface 52 parallel to and in confronting relationship with, the flat surface 36.

A suitable actuator 72 is provided at the footprint surface 52 and may be mechanical, electrical, or optical in nature according to conventional design. The actuator 72 will typically sense two-dimensional movement of the actuating base 14 as an incident of which a signal will be generated to the electronic device 12.

As shown in FIG. 10, the mouse 10 may have indicia 74 on at least one of the actuating base 14 and elongate member 18 that provide a frame of reference that indicates to a user an orientation of the mouse 10, thereby to allow the user to controllably orient and move the mouse in predetermined operating paths, commonly based upon a two axis system. Exemplary indicia are shown in FIG. 8 at 74', 74", to align with transverse x and y axes.

Alternatively, as shown in FIG. 11, the actuating base and/or elongate member 18 may incorporate a shape or shapes 76 that visually or tactilely provide the same indication as do the indicia 74 in FIG. 10 to facilitate operation. This may be particularly helpful with the configuration shown in this embodiment, wherein the front, rear, and sides of the actuating base 14 are not readily discernible from the shape of the actuating base 14.

In this embodiment for the mouse 10, the connection of the elongate member 18 to the actuating base 14 is at or adjacent to the central axis 54 of the actuating base 14. Further, the connection is such that with the elongate member 18 operatively held as in FIG. 7, the central axis 26 of the elongate member 18 extends through the footprint surface 52 through most, if not all, of the workable range of angular relationships between the elongate member 18 and actuating base 14.

The mouse functions may be carried out/initiated through the use of virtually an unlimited number of different types of actuators. The actuator 76, as shown in FIG. 9 in addition to the actuator(s) 72, may be provided, as in the form of a depressible button, to perform a function on the electronic device 12 through the mouse 10. The actuator 76 may be operated as by moving the footprint surface 52 towards or forcible against the surface 36 by manipulating the actuating base 14 directly or manipulating the actuating base 14 through the elongate member 18.

Alternatively, or additionally, an actuator 78 may be provided on the external surface 80 of the cap portion 40.

As a further alternative, or additionally, actuators may be provided on the moving assembly 16. In the depicted embodiment, separate pressure-operated actuators 82, 84 are provided upon the elongate member 18. The actuators 82, 84 might be operated through the application of pressure by the user's index finger and thumb, respectively, with the elongate member 18 operatively held as in FIG. 7.

An actuator 86 is shown in FIG. 7 in the form of a dial that is rotatable around an axis 88 that is shown to be orthogonal to the lengthwise axis 26.

In FIG. 7, a further alternative form of actuator 89 is shown that is operated by bending the elongate member 18, twisting the elongate member 18, or otherwise reconfiguring the same.

In FIG. 12, a further alternative form of actuator is shown at 90, in the form of a dial that extends continuously, and is rotated, around the lengthwise axis 26' of a modified form of elongate member 18'.

All of the actuators, and additional actuators, might be incorporated to interface with the electronic device 12 to perform any desired operation associated with the electronic device 12.

It is desired, but not required, that the repositionable actuators be operable by a user's hand 32 with the user's hand operatively holding the elongate member in the same manner that an elongate writing instrument would be held by the user's hand during a writing action.

As noted above, the end 30 of the elongate member 18 and ears 44, 46 interact to cause the elongate member 18 to be blocked in different angular positions relative to the actuating base.

Figure 13:
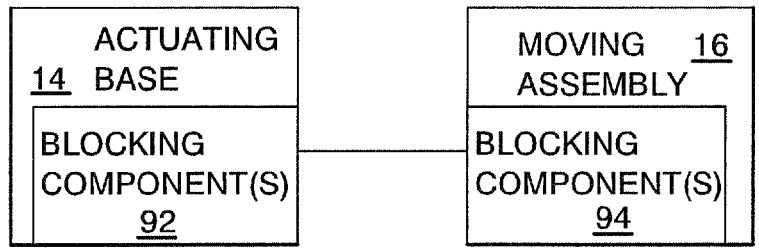
FIG. 13 is a schematic representation of components cooperating between the actuating base and moving assembly to controllably block movement of the elongate element relative to the actuating base.

Alternatively, or additionally, as shown in FIG. 13, one or more blocking components 92, 94 may be provided on the actuating base 14 and moving assembly 16 that cooperate to cause the elongate member 18 on the mouse 10 to be blocked in one or more predetermined angular positions relative to the actuating base 14. A structure may be incorporated to avoid unimpeded universal relative movement between the elongate member 18 and actuating base 14, thereby limiting relative movement within a range that is more practical and avoiding unnecessary manipulation of the elongate member 18 during setup and use.

Figure 14:
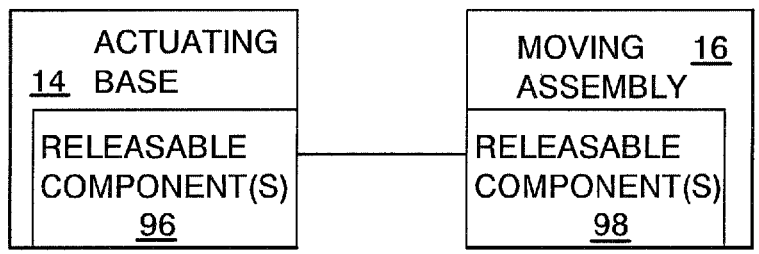
FIG. 14 is a schematic representation of releasable components cooperating between the actuating base and moving assembly to releasably maintain the elongate element in desired angular relationship to the actuating base.

Another optional feature is shown in FIG. 14 and consists of one or more components 96, 98, respectively on the actuating base 14 and moving assembly 16, that releasably maintain the elongate member 18 in at least one predetermined angular position relative to the actuating base 14. The releasable components 96, 98 may produce a detent arrangement. As one example, the components 96, 98 may cooperate to maintain the elongate member 18 in an upright, stored orientation as shown in FIG. 4. Any other desired, relative positions might be maintained, including that shown in FIG. 7, wherein the elongate member 18 is situated to be operatively held.

The components 96, 98 may be configured so that the elongate member 18 can be moved in a first path in a first direction, as indicated by the arrow A in FIG. 4, into the desired predetermined angular position. The elongate member 18 can be moved out of that predetermined angular position by exerting a force in the first direction, as indicated by the arrow A1 that overcomes the holding force to allow the elongate member 18 to move in the same path in the same direction beyond the one predetermined angular position.

Figure 15:
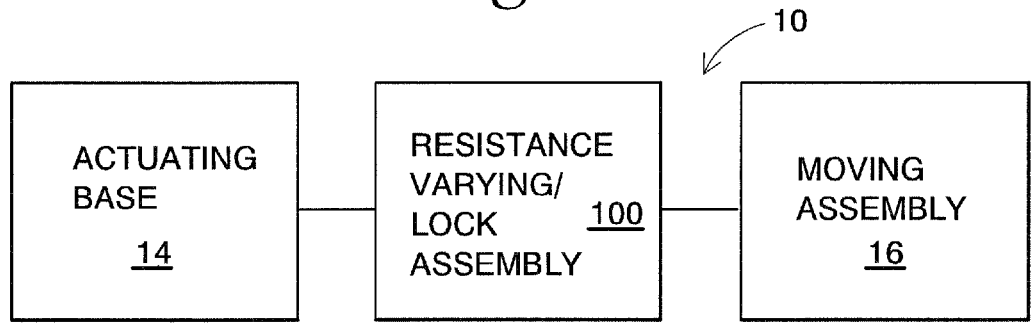
FIG. 15 is a schematic representation of a resistance varying/lock assembly for selectively controlling the resistance of movement of the elongate member relative to the actuating base and potentially for locking the elongate member in a desired angular position relative to the actuating base.

As shown in FIG. 15, a further optional feature is the incorporation into the mouse 10 of a resistance varying/lock assembly 100. Such an assembly might be readily designed by one skilled in the art to selectively vary resistance to relative movement between the elongate member on the moving assembly 16 and the actuating base 14. The same type of mechanism may be used to cause the elongate member 18 to be releasably fixed relative to the actuating base 14. Details of the resistance varying assembly/lock assembly 100 are not shown, as many different types of mechanisms might be devised by one skilled in the art to accomplish this.

The invention contemplates further modifications/additions to the structures described above. As one example, the controlled guided movement of the elongate member 18 relative to the actuating base 14 might be effected using a single axle around a single pivot axis, as by eliminating one of the axles 60, 62 shown in FIG. 8. Other types of single pivot axis connections are contemplated.

Figure 16:
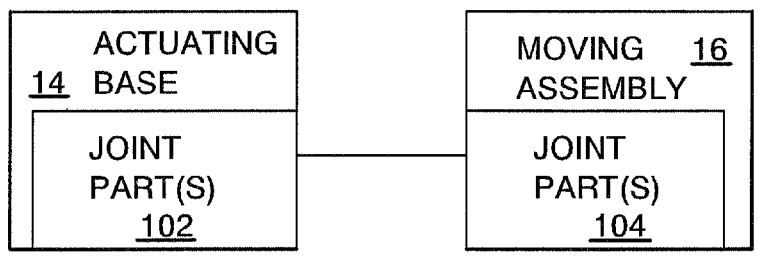
FIG. 16 is a schematic representation of generic joint parts cooperating between the actuating base and moving assembly.

Further, multi-axis relative movement between the elongate member 18 and actuating base 14 are contemplated without requiring the universal joint construction. Such a joint is encompassed within the schematic showing in FIG. 16, wherein the actuating base 14 and moving assembly 16 are shown to have generic, cooperating joint parts 102, 104. The multiple axes may be orthogonal, parallel, or otherwise angled. The FIG. 16 showing is also intended to encompass joints that may controllably guide relative movement without a fixed pivot axis arrangement. For example, the joint parts might guidingly translate relative to each other to permit the desired movement of the elongate member 18 relative to the actuating base 14.

Figure 17:
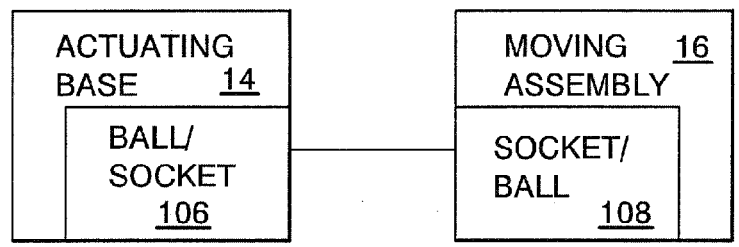
FIG. 17 is a schematic representation of a mouse according to the invention incorporating a ball-and-socket connection between the actuating base and moving assembly.

In FIG. 17, an alternative joint connection is shown in the form of a ball-and-socket arrangement. The actuating base 14 has a ball/socket 106 that cooperates with a socket/ball 108 on the moving assembly 16 to permit the desired controlled guided movement of the elongate member 18 relative to the actuating base 14. As indicated, the ball may be on either of the actuating base 14 and moving assembly 16, with the socket being on the other of the actuating base/moving assembly 16.

With the ball-and-socket arrangement, the structure shown in FIGS. 13 and 14 might additionally be incorporated to limit the range of relative movement and maintain desired relationships between these components. Additionally, the structure in FIG. 15 might be incorporated for the purposes described above.

Figure 18:
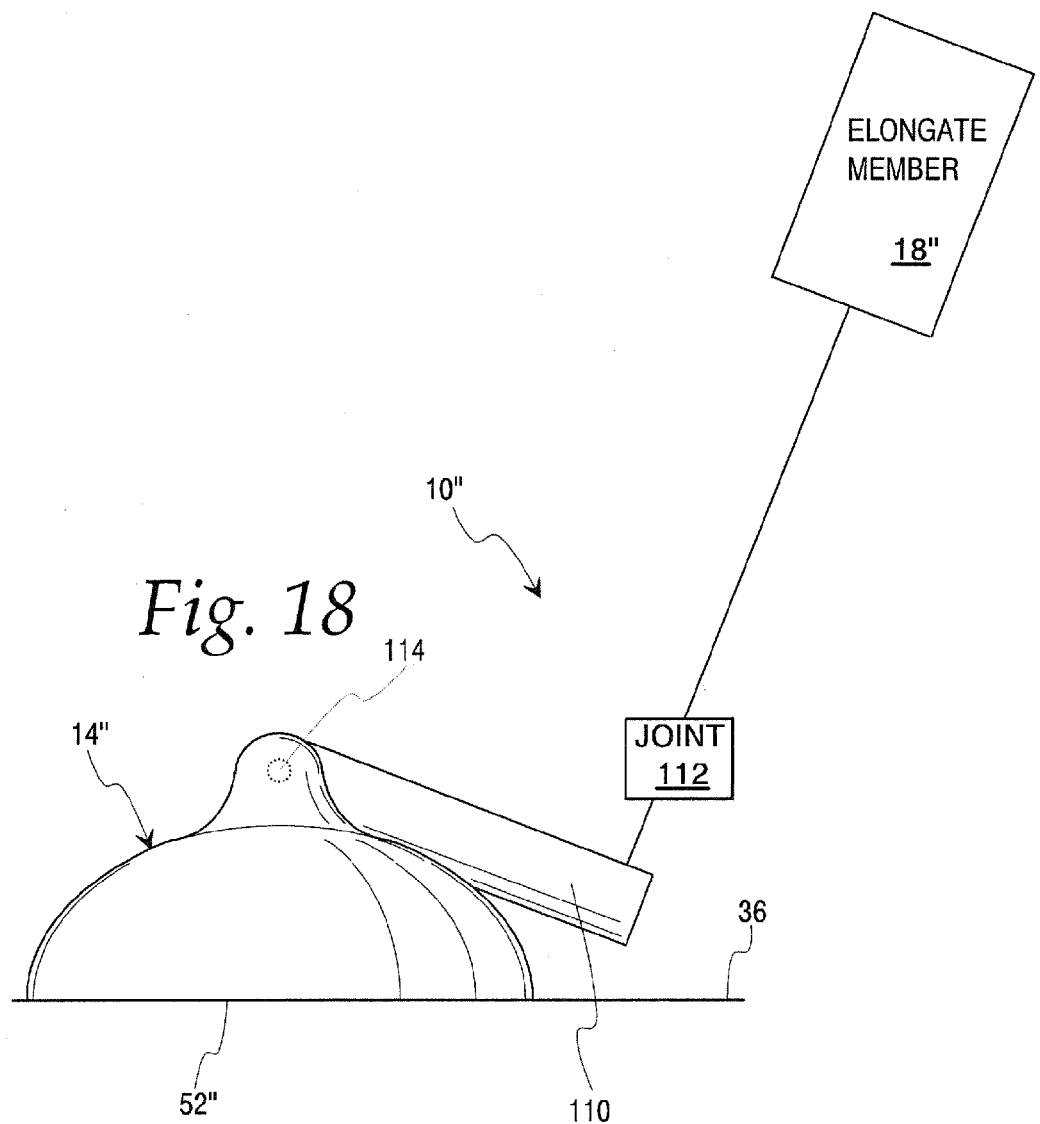
FIG. 18 is a partially schematic, elevation view of a modified form of mouse wherein an elongate member thereon has a different relationship to the actuating base.

In FIG. 18, a further modified form of mouse is shown at 10" and incorporates an actuating base 14" and elongate member 18". The actuating base 14" has the same general configuration as the actuating base 14, but incorporates an extension or yoke 110. The modified elongate member 18" is connected in any of the above manners at a joint 112 so that the axis of the elongate member 18" does not extend through the footprint surface 52". With this arrangement, the connection of the elongate member 18" to the actuating base 14" can be made without having to compensate for the height of, or any interference with, the actuating base 14", while allowing the user's hand 32 to operatively hold the elongate member

18" in a manner more closely resembling that of a how a writing instrument would be held during a writing action. That is, depending upon the height of the actuating base 14, the user's wrist might have to be slightly bent to elevate the hand. The yoke 110 allows a relatively high profile actuating base 14 to be employed while allowing the hand to operatively hold the elongate member 18" at a lower location the same way it would be used to hold a pen during a writing activity.

The same end might be achieved by connecting the elongate member 18 at a lower location upon the actuating base 14.

In this embodiment, the yoke 110 might be permanently fixed or might be pivotable about an axle 114.

Figure 19:
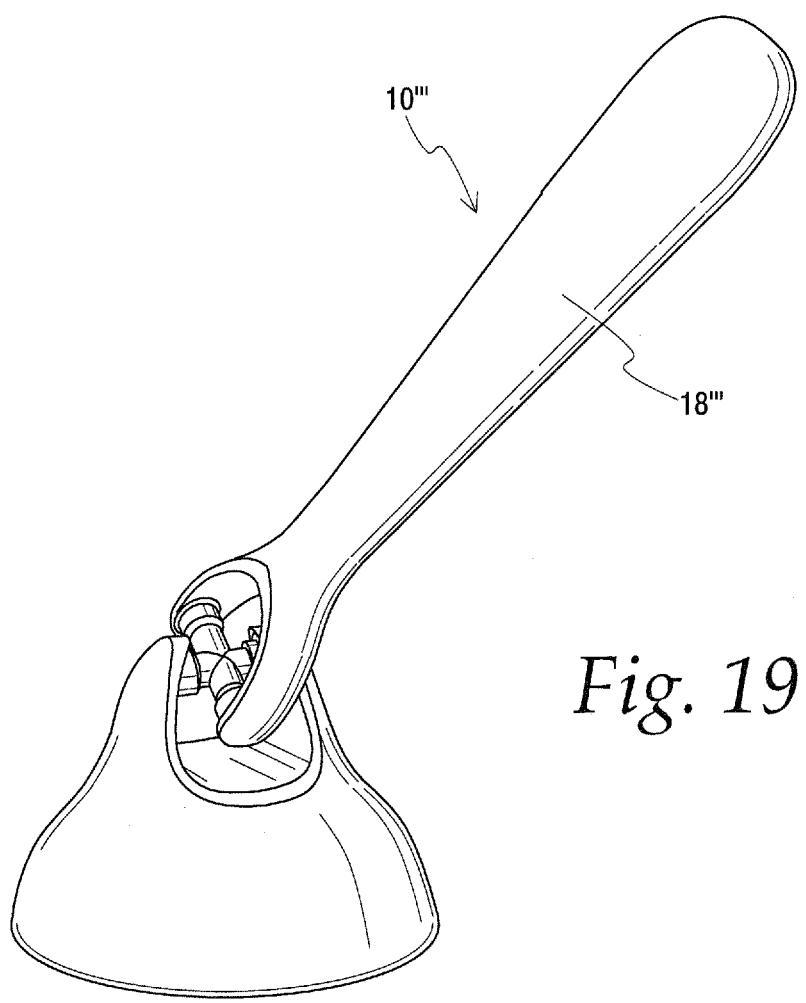
FIG. 19 is a view as in FIG. 7 of a further modified form of mouse, according to the invention.

One further modification is shown for a mouse 10''' in FIG. 19, which has a shorter elongate member 18'''. The precise configuration of the elongate member can be adapted to a user's preference.

The foregoing disclosure of specific embodiments is intended to be illustrative of the broad concepts comprehended by the invention.

The invention claimed is:

1. A mouse for operating an electronic device, the mouse comprising:
    an actuating base that is movable relative to a guide surface to thereby perform a function on an associated electronic device, the actuating base having a top and bottom and a height between the top and bottom; and
    a moving assembly for the actuating base,
    the moving assembly comprising an elongate member with a central lengthwise axis,
    the elongate member constructed to be: a) operatively held in a user's hand that is configured to hold the elongate member in the same manner that an elongate writing instrument would be held by a user's hand during a writing action; and b) moved while being operatively held to thereby cause the actuating base to be moved relative to the surface,
    the elongate member connected to the actuating base for controlled guided movement relative to the actuating base to thereby change an angular relationship between the central lengthwise axis of the elongate member and the actuating base,
    the actuating base defined by a wall having a generally circular perimeter shape with a diameter around a vertical axis,
    the diameter of the actuating base substantially greater than the diameter of the elongate member,
    the diameter of the perimeter shape decreasing progressively from a location adjacent the bottom of the actuating base over a majority of the height of the actuating base.

2. The mouse for operating an electronic device according to claim 1 wherein the elongate member is connected to the actuating base through a joint wherein the elongate member pivots relative to the actuating base around an axis.

3. The mouse for operating an electronic device according to claim 1 wherein the elongate member is connected to the actuating base through a joint wherein the elongate member pivots relative to the actuating base around first and second transverse axes.

4. The mouse for operating an electronic device according to claim 1 wherein the elongate member is connected to the actuating base through a universal joint.

5. The mouse for operating an electronic device according to claim 1 wherein the actuating base is configured with a footprint surface to be operatively positioned against and movable relative to a flat surface to perform a function on an associated electronic device, and with the actuating base operatively positioned and the elongate member operatively held, the central axis of the elongate member extends through the footprint surface.

6. The mouse for operating an electronic device according to claim 1 wherein the actuating base is configured to be operatively positioned against and movable relative to a flat surface to perform a function on an associated electronic device and with the actuating base operatively positioned and the elongate member operatively held, the central axis of the elongate member does not extend through the footprint surface.

7. The mouse for operating an electronic device according to claim 1 wherein the elongate member is connected to the actuating base through cooperating ball and socket components.

8. The mouse for operating an electronic device according to claim 1 wherein the mouse comprises cooperating components on the moving assembly and actuating base that cause the elongate member to be blocked in at least one predetermined angular position relative to the actuating base.

9. The mouse for operating an electronic device according to claim 1 wherein the mouse comprises cooperating components on the moving assembly and actuating base that releasably maintain the elongate member in at least one predetermined angular position relative to the actuating base.

10. The mouse for operating an electronic device according to claim 9 wherein the cooperating components are configured so that the elongate member can be moved: a) in a first direction in a first path up to and into the one predetermined angular position; and b) in the first direction and first path beyond the one predetermined angular position.

11. The mouse for operating an electronic device according to claim 1 wherein the mouse further comprises a resistance varying assembly for selectively varying resistance to relative movement between the elongate member and actuating base.

12. The mouse for operating an electronic device according to claim 1 wherein there is a repositionable actuator on the moving assembly for performing a function on an associated electronic device.

13. The mouse for operating an electronic device according to claim 12 wherein the repositionable actuator is operable by a user's hand with the user's hand operatively holding the elongate member in the same manner that an elongate writing instrument would be held by a user's hand during a writing action.

14. The mouse for operating an electronic device according to claim 1 wherein there is a repositionable actuator on the actuating base for performing a function on an associated electronic device.

15. The mouse for operating an electronic device according to claim 1 in combination with an electronic device to which the mouse is operatively connected.

16. The mouse for operating an electronic device according to claim 1 wherein the actuating base is configured to move in predetermined operating paths relative to the cooperating surface and the actuating base and/or moving assembly has at least one of: a) a shape; and b) indicia thereon that indicates to a user an orientation of the mouse to allow the user to controllably orient and move the mouse in the predetermined operating paths.

17. The mouse for operating an electronic device according to claim 1 wherein the actuating base is configured with a flat footprint surface that is substantially circular with an orthogonal central axis and the elongate member is connected to the actuating base adjacent to the central axis.

18. The mouse for operating an electronic device according to claim 17 wherein the flat footprint surface has a diameter that is not greater than 2½ inches.

19. The mouse for operating an electronic device according to claim 1 wherein the mouse further comprises a lock assembly through which the elongate member can be releasably fixed relative to the actuating base.

20. The mouse for operating an electronic device according to claim 1 wherein the elongate member has a nominally cylindrical outer surface.

21. The mouse for operating an electronic device according to claim 1 wherein the perimeter shape approximates the shape of a truncated sphere.

22. The mouse for operating an electronic device according to claim 21 wherein the truncated spherical shape extends to the bottom of the actuating base.

* * * * *